(12) United States Patent
LaTour et al.

(10) Patent No.: US 11,679,438 B2
(45) Date of Patent: *Jun. 20, 2023

(54) PROCESS FOR MANUFACTURING METAL PARTS USING DEPLOYABLE MANUFACTURING CENTER (DMC) SYSTEM

(71) Applicant: MolyWorks Materials Corporation, Cloverdale, CA (US)

(72) Inventors: Andrew VanOs LaTour, Hayward, CA (US); Christopher Paul Eonta, Los Gatos, CA (US); Matthew Charles, Cloverdale, CA (US); Scott Steiner, Ukiah, CA (US); Joel Cheng, Campbell, CA (US)

(73) Assignee: MolyWorks Materials Corporation, Cloverdale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,063

(22) Filed: Jan. 24, 2022

(65) Prior Publication Data

US 2022/0168805 A1 Jun. 2, 2022

Related U.S. Application Data

(62) Division of application No. 16/135,191, filed on Sep. 19, 2018, now Pat. No. 11,235,389.

(51) Int. Cl.
*B22F 10/25* (2021.01)
*B22F 10/28* (2021.01)
(Continued)

(52) U.S. Cl.
CPC ............. *B22F 9/082* (2013.01); *B22F 10/25* (2021.01); *B22F 10/28* (2021.01); *B22F 10/64* (2021.01);
(Continued)

(58) Field of Classification Search
None
See application file for complete search history.

(56) References Cited

U.S. PATENT DOCUMENTS

| 4,750,542 A | 6/1988 | Harker et al. |
| 4,952,237 A | 8/1990 | Dube et al. |

(Continued)

FOREIGN PATENT DOCUMENTS

| CN | 104550960 A | 4/2015 |
| CN | 106541142 A | 3/2017 |

(Continued)

OTHER PUBLICATIONS

English Translation of CN 104550960 (originally published Apr. 29, 2015) obtained from PE2E search.*

(Continued)

*Primary Examiner* — George Wyszomierski
(74) *Attorney, Agent, or Firm* — Stephen A Gratton

(57) ABSTRACT

A deployable manufacturing center (DMC) system includes a foundry module containing a metallurgical system configured to convert a raw material into an alloy powder, and an additive manufacturing (AM) module containing an additive manufacturing system configured to form the alloy powder into metal parts. The deployable manufacturing center (DMC) system can also include a machining module containing a machining system configured to machine the metal parts into machined metal parts, and a quality conformance (QC) module containing an inspection and evaluation system configured to inspect and evaluate the metal parts. A process for manufacturing metal parts includes the steps of providing the deployable manufacturing center (DMC) system; deploying the (DMC) system to a desired location; forming an alloy powder from a raw material using the deployable foundry module; and then forming the metal (Continued)

parts from the alloy powder using the additive manufacturing (AM) module.

20 Claims, 3 Drawing Sheets

(51) Int. Cl.
| | | |
|---|---|---|
| B22F 9/08 | (2006.01) | |
| B22F 12/82 | (2021.01) | |
| B22F 12/86 | (2021.01) | |
| B22F 10/64 | (2021.01) | |
| B22F 10/66 | (2021.01) | |
| B33Y 70/00 | (2020.01) | |
| B33Y 10/00 | (2015.01) | |
| B33Y 30/00 | (2015.01) | |
| B33Y 40/00 | (2020.01) | |

(52) U.S. Cl.
CPC .............. *B22F 10/66* (2021.01); *B22F 12/82* (2021.01); *B22F 12/86* (2021.01); *B22F 2009/084* (2013.01); *B22F 2009/0836* (2013.01); *B22F 2009/0896* (2013.01); *B33Y 10/00* (2014.12); *B33Y 30/00* (2014.12); *B33Y 40/00* (2014.12); *B33Y 70/00* (2014.12)

(56) References Cited

U.S. PATENT DOCUMENTS

| | | | |
|---|---|---|---|
| 5,224,534 | A | 7/1993 | Shimizu et al. |
| 5,963,579 | A | 10/1999 | Henryon |
| 7,754,519 | B1 | 7/2010 | Tolles et al. |
| 8,871,109 | B2 | 10/2014 | Prabhu et al. |
| 9,399,322 | B2 | 7/2016 | Mulliken |
| 9,925,591 | B2 | 3/2018 | Eonta et al. |
| 11,235,389 | B2 | 2/2022 | LaTour et al. |
| 11,541,458 | B2 | 1/2023 | Ziegenfuss et al. |
| 2009/0206085 | A1 | 8/2009 | Schenker |
| 2011/0223493 | A1* | 9/2011 | Christian .............. B26B 21/521 427/126.6 |
| 2012/0279349 | A1 | 11/2012 | Cobos Jimenez et al. |
| 2013/0199611 | A1 | 8/2013 | Murali et al. |
| 2014/0048201 | A1 | 2/2014 | Sabbaraman et al. |
| 2014/0252685 | A1 | 9/2014 | Stacker et al. |
| 2014/0374933 | A1 | 12/2014 | Flitsch et al. |
| 2016/0053346 | A1 | 2/2016 | Szuromi et al. |
| 2016/0199907 | A1 | 7/2016 | Jarvis et al. |
| 2017/0239753 | A1* | 8/2017 | Yerazunis ............ B23K 26/342 |
| 2018/0133804 | A1 | 5/2018 | van Hassel et al. |
| 2018/0169761 | A1 | 6/2018 | Eonta et al. |
| 2019/0119787 | A1 | 4/2019 | Cotton et al. |
| 2020/0189000 | A1 | 6/2020 | LaTour et al. |

FOREIGN PATENT DOCUMENTS

| | | |
|---|---|---|
| GB | 2527266 A * 12/2015 | |
| WO | WO 2017/203245 A1 11/2017 | |

OTHER PUBLICATIONS

International Application No. PCT/US19/41906, International Search Report and Written Opinion of the International Searching Authority, dated Oct. 11, 2019, pp. 1-9.

Pepi, M. et al., Manufacturing at the Point of Need Using Recycled, Reclaimed, and/or Indigienous Materials, DSIAC Journal, vol. 3 No. 3, Summer 2018, pp. 26-37.

International Application No. PCT/US 20/ 41106, the International Search Report and the Written Opinion of the International Searching Authority, dated Dec. 18, 2020, pp. 1-14.

Tootooni et al., Classifying the Dimensional Variation in Additive Manufactured Parts From Laser-Scanned Three-Dimensional Point Cloud Data Using Machine Learning Approaches:, Journal of Manufacturing Science and Engineering, vol. 139, No. 9, 2017.

International application No. PCT/US 19/62111, International Search Report and the Written Opinion of the International Searching Authority, or the Declaration, dated Feb. 27, 2020, pp. 1-11.

Abstract of SBIR contract solicitation No. 2016.1, "Processing of Metallic Scrap Materials for Battlefield Additive Manufacturing", proposal award date Aug. 1, 2016.

European Application No. 19862145.0, Extended European Search Report, dated Aug. 19, 2022, pp. 1-7.

Singapore Application No. 11202102612V, Written Opinion from the Intellectual Property Office of Singapore, dated Jul. 7, 2022, pp. 1-5.

* cited by examiner

PROCESS FOR MANUFACTURING METAL PARTS USING DEPLOYABLE MANUFACTURING CENTER (DMC) SYSTEM

CROSS REFERENCE TO RELATED APPLICATION

This application is a division of application Ser. No. 16/135,191, U.S. Pat. No. 11,235,389, filed Sep. 19, 2018, which are incorporated herein by reference.

FIELD

This disclosure relates to metal recycling, to additive manufacturing and to deployable manufacturing.

BACKGROUND

Recycling of metals is a common practice due to favorable economics and environmental benefits. The steel industry has been actively recycling for more than 150 years, and in the United States almost all structural steel and automobiles are recycled. For many metals, recycling requires less energy compared to refinement from ore. According to research conducted by the US Environmental Protection Agency, using recycled scrap metal instead of virgin ore provides numerous benefits in steel production including: a 75% savings in energy, a 90% savings in raw materials, an 86% reduction in air pollution, a 40% reduction in water, a 76% reduction in water pollution, and a 97% reduction in mining wastes. Energy savings for other metals include 95% for aluminum and 85% for copper.

Additive Manufacturing (AM) is a field undergoing rapid growth, and is expected to eventually replace most conventional forms of manufacturing. In AM, metal powder can be used to create parts directly. Powder not used during part production can be recycled several times to directly produce more parts, without the additional steps of re-melting and casting. In addition to cost savings, AM has the potential to produce complex parts from a single process. Internal geometries that are impossible to machine can be printed, allowing further savings in raw materials, energy and cost. The versatility of AM allows a single production facility to be capable of producing multiple types of parts.

The present disclosure is directed to a deployable manufacturing center (DMC) system that can be deployed in remote locations for processing a raw material to produce metal parts. In addition, the present disclosure is directed to a process for manufacturing metal parts using a deployable manufacturing center (DMC) system.

SUMMARY

A deployable manufacturing center (DMC) system includes an array of modules containing equipment configured to convert a raw material, such as recycled metal, into an alloy powder, and then to build metal parts from the alloy powder using an additive manufacturing (AM) process.

In the (DMC) system, a foundry module contains a metallurgical system configured to convert the raw material into the alloy powder, and an additive manufacturing (AM) module contains an additive manufacturing system configured to form the alloy powder into the metal parts. In illustrative embodiments, the metallurgical system comprises a mixing cold hearth and an atomization system, and the additive manufacturing (AM) system comprises a 3-D printer. In addition, the metal parts can be formed in whole using the additive manufacturing (AM) system, or can be existing parts repaired or reconfigured by alloy powder added by the additive manufacturing (AM) system.

The deployable manufacturing center (DMC) system can also include a machining module containing a machining system configured to machine the metal parts into machined metal parts, and a quality conformance (QC) module containing an inspection and evaluation system configured to inspect and evaluate the metal parts.

A process for manufacturing metal parts includes the steps of: providing a deployable manufacturing center (DMC) system comprising a foundry module containing a metallurgical system, and an additive manufacturing (AM) module containing an additive manufacturing system; deploying the deployable manufacturing center (DMC) system to a desired location; forming an alloy powder from a raw material using the foundry module, and then forming the metal parts from the alloy powder using the additive manufacturing (AM) module. By way of example, the raw material can comprises battlefield material and the desired location can be proximate to the battlefield.

The process can also include the steps of: providing a machining module containing machinery configured to machine the metal parts, and a quality conformance (QC) module containing equipment configured to inspect and evaluate the metal parts; machining the metal parts into machined metal parts using the machining module; and inspecting and evaluating the metal parts using the quality conformance (QC) module.

BRIEF DESCRIPTION OF THE DRAWINGS

Exemplary embodiments are illustrated in the referenced figures of the drawings. It is intended that the embodiments and the figures disclosed herein be considered illustrative rather than limiting.

DETAILED DESCRIPTION

Figure 1:
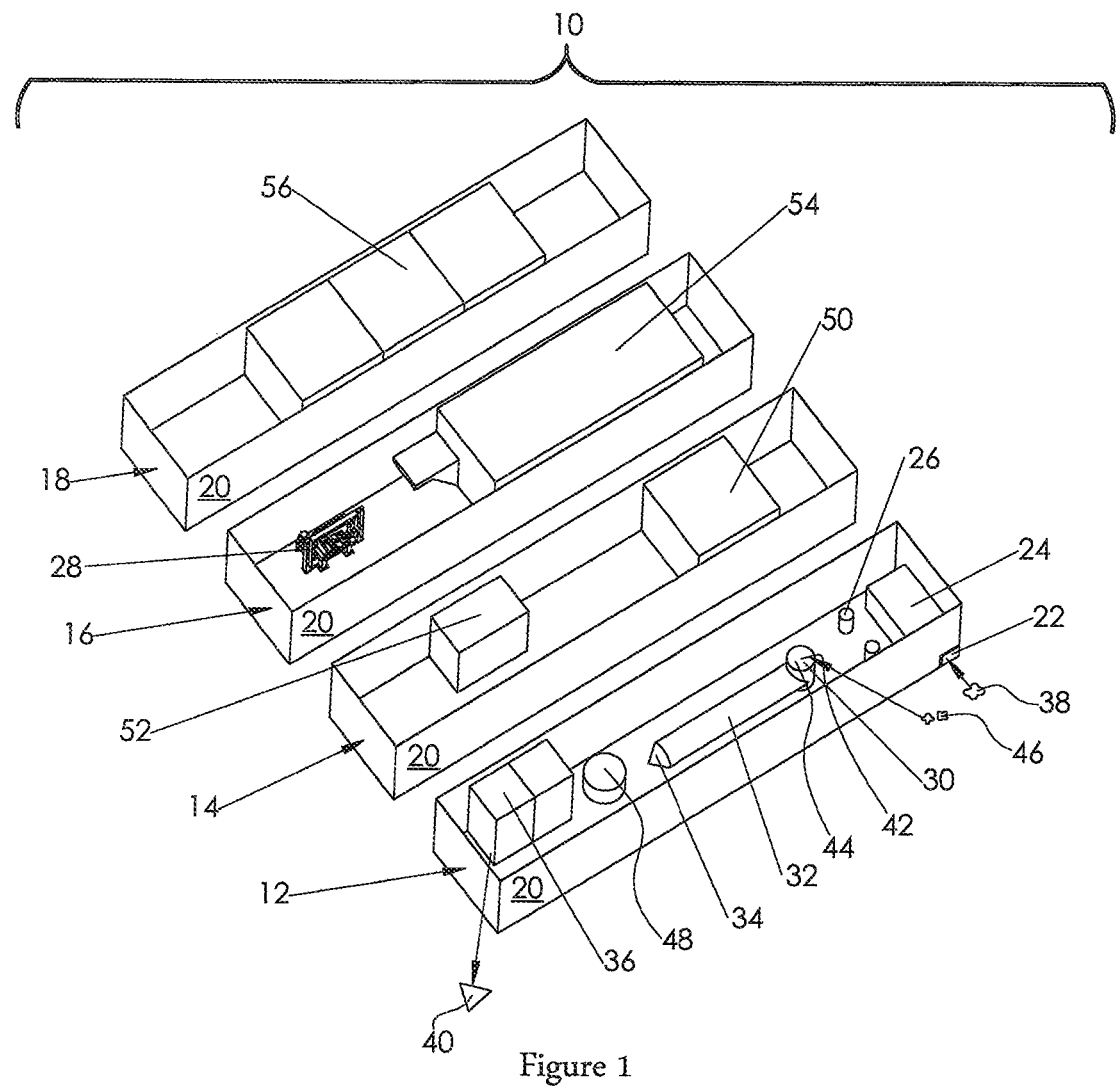
FIG. 1 is schematic perspective view partially cut away of a deployable manufacturing center (DMC) system.

Referring to FIG. 1, a deployable manufacturing center (DMC) system 10 includes a foundry module 12, an additive manufacturing (AM) module 14, a machining module 16 and a quality conformance (QC) module 18. Although the deployable manufacturing center (DMC) system 10 includes four modules 12, 14, 16, 18, it is to be understood that other (DMC) systems can be constructed with any number of modules, with from one to twenty modules being exemplary.

Each module 12, 14, 16, 18 comprises a container 20 sized to contain the necessary equipment. For example, each container 20 can comprise a standard sized metal shipping container that can be easily transported by truck, rail or ship. Exemplary sizes include 8'×20' and 8'×40'. The containers 20 can include access openings 22, such as doors or hatches, sized to allow people, raw materials, equipment, and metal parts into and out of the containers 20.

In the deployable manufacturing center (DMC) system 10, the foundry module 12 is configured to produce an alloy powder from a raw material. Exemplary raw materials include recycled metal, scrap, waste, indigenous materials, or a combination of feedstocks. U.S. Pat. No. 9,925,591 B2 entitled "Mixing Cold Hearth Metallurgical System and Process For Producing Metals and Metal Alloys", which is incorporated herein by reference, describes some of the foundry equipment that can be used in the foundry module 12. Further details of the foundry module 12 will be explained as the description proceeds.

The additive manufacturing (AM) module 14 is configured to form the alloy powder into metal parts using an additive manufacturing (AM) process. One exemplary additive manufacturing process comprises 3D printing performed with a laser or electron-beam system. Other exemplary additive manufacturing processes include direct energy deposition, powder bed fusion and cold spray. As will be further explained, the additive manufacturing (AM) module 14 can also be configured to heat treat the metal parts.

Using the foundry module 12 followed by the additive manufacturing (AM) module 14, a significant portion of the supply chain for manufacturing metal parts is no longer required. Metal parts can be fabricated from indigenous raw materials, such as scrap metal, that is melted, formed into alloy powder, and then formed into parts via an additive manufacturing (AM) process. With readily available raw materials, such as scrap metal, a variety of components can be quickly manufactured as needed, eliminating long lead times associated with shipping. The ability to rapidly produce an alloy powder as needed eliminates the requirement for large inventories of metal powder that would typically be required for additive manufacturing (AM). Without the need for large inventories, storage space can be reduced.

The machining module 16 is configured to machine the metal parts into machined metal parts using a machining process. In general, the machining process removes excess material and modifies surface roughness. Exemplary machining processes include grinding, polishing, drilling and lathing.

The quality conformance (QC) module 18 is configured to inspect and evaluate the metal parts to ascertain that the dimensions of the metal parts meet the design specifications. These processes can be performed visually, manually, or with automated equipment, such as x-ray or CT scan.

Further details of each module 12, 14, 16, 18 will now be explained.

Figure 2:
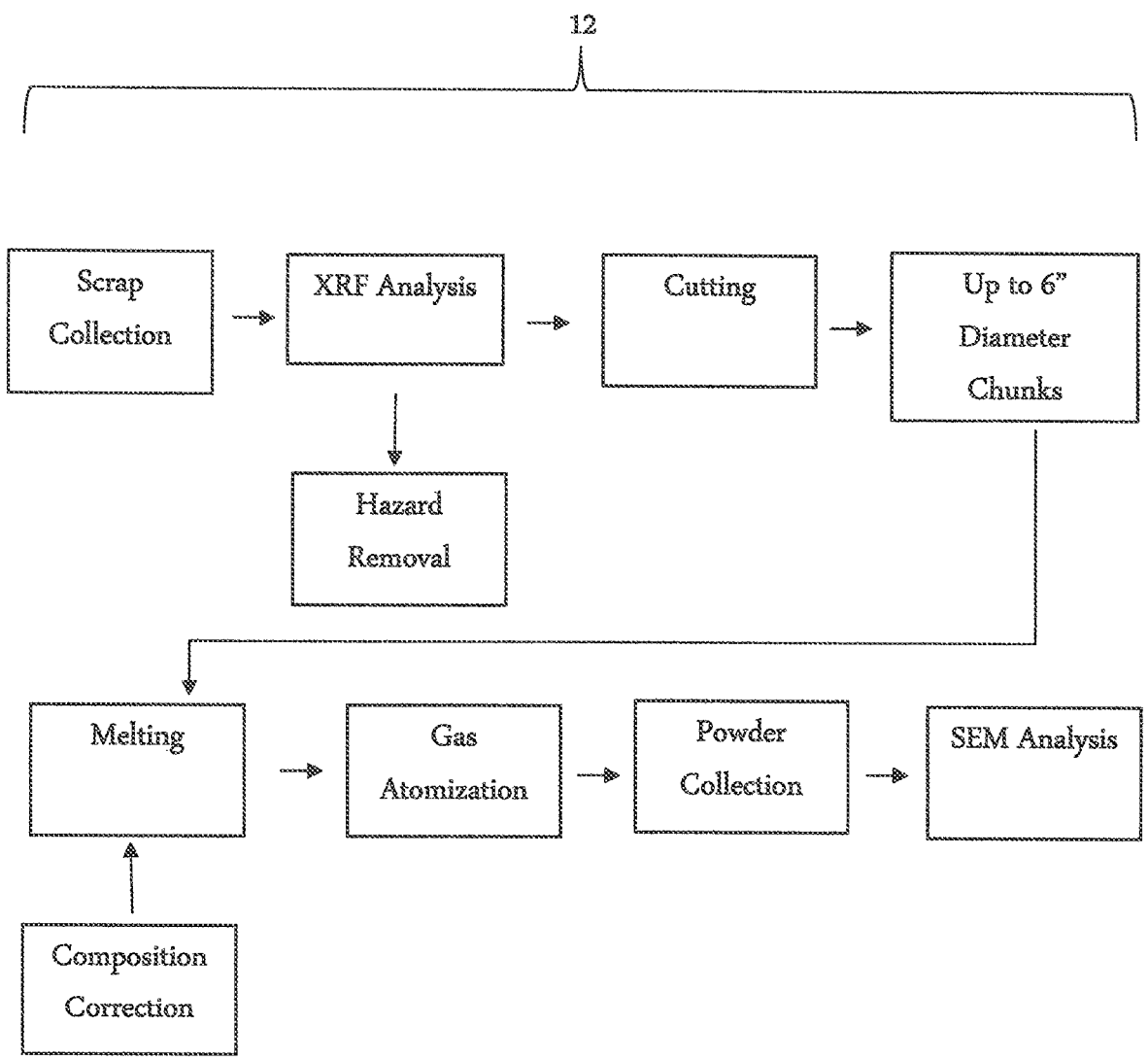
FIG. 2 is a schematic diagram illustrating equipment and processes of a foundry module of the deployable manufacturing center (DMC) system.

Foundry Module 12. Referring to FIG. 2, in the illustrative embodiment, the foundry module 12 includes a scrap collection container 24, an XRF analysis instrument 26, a saw 28, a mixing cold hearth 30, a gas atomization system 32, a cyclone 34 and a SEM analysis apparatus 36.

As also shown in FIG. 2, the foundry module 12 is configured to store a feedstock 38, to analyze the chemical composition of the feedstock 38, to remove contaminants and hazardous components 40 from the feedstock 38, to cut large pieces of feedstock 38 to smaller chunks 42, to melt the feedstock 38 to form a molten metal 44, to correct the composition of the molten metal using selected chemical additives 46, to atomize the molten metal 44 into an alloy powder 48, to collect the alloy powder 48, and then to analyze the alloy powder 48.

With respect to the feedstock 38: Wherever metal parts are expended, steel, stainless steel, aluminum, and copper are likely to be found. Steel, stainless steel, and aluminum are used widely in buildings, vehicles, and equipment in the form of structural elements and panels. Copper is prevalent in wire and tubing. Titanium, although relatively rare compared to the aforementioned metals, can be found in aircraft components. Military equipment, vehicles, armor, tanks, and weapons are composed primarily of steel and aluminum alloys.

In one embodiment, steel, stainless steel, copper, aluminum, and titanium are the primary metals to be processed. In another embodiment, scrap metals may be collected from a battlefield near a forward operating base. In another embodiment, parts can be recycled on board an aircraft carrier, oil rig, or some other remote facility. In the preferred embodiment, large pieces of metal scrap are collected, analyzed by handheld XRF, and cut to pieces smaller than 6" in diameter. Small fragments of scrap materials are not collected due to lower yield, greater variations in alloy composition, and increased likelihood of contamination.

Hazardous components 40, such as radioactive materials, toxic materials such as asbestos, or metals such as beryllium, cadmium, and mercury pose dangers to personnel and are removed from the feedstock 38 before processing. In addition, hazardous components 40 such as fuel tanks or gas tanks are also removed from the feedstock 40 before processing, as they may contain pressurized or flammable materials that pose a serious threat to personnel and equipment.

Chemical analysis of the feedstock 38 can be performed to predict elements needed for correction of the final composition to the desired alloy. Ideally, a batch is composed of scrap from a single source material. This makes the composition relatively easy to predict and correct. When feedstock 38 is inconsistent, however, predictive analysis is not sufficient. For inconsistent feedstock 38, a post-melt chemical analysis is performed to determine the composition of the material. After the mixed-scrap composition is determined, the alloy is corrected to its desired composition.

Following chemical analysis the feedstock 38 can be cut into smaller chunks 42 using a portable band saw, a plasma cutter, scrap shears, or any other convenient tool for cutting.

Following the cutting process, the chunks can be melted into the molten metal 44. In one embodiment, melting can be accomplished in two stages. In a first stage electrical current can be passed through plasma gas into a pool of the feedstock 38. A plasma torch can then be used to direct plasma gas and generate an electric arc, heating the feedstock 38 to the desired temperature and melting into the molten metal 44. The mixing cold hearth 30 can then be used to mix the molten metal 44 and provide a uniform composition, with composition correction performed if necessary.

Previously cited U.S. Pat. No. 9,925,591 B2 discloses exemplary metallurgical systems that include mixing cold hearths that can be used to construct the mixing cold hearth 30. For example, the mixing cold hearth 30 can include fluid cooled walls, a melting cavity configured to hold the molten metal 44, and an induction coil configured to generate an electromagnetic field for stirring and heating the molten metal 44. The mixing cold hearth 30 can also include a mechanical drive configured to mount and move the mixing cold hearth 30 for mixing the molten metal 44 in the melting cavity and to rotate the mixing cold hearth 30 for pouring the molten metal 44 from the melting cavity. Movement of the mixing cold hearth 30 by the mechanical drive can include both oscillatory motion and rotational motion or a combination thereof. The mixing cold hearth 30 can also include a skull at least partially lining the melting cavity and configured to provide a heat transfer boundary for the molten metal 44. In addition, the mixing cold hearth 30 can comprise a removal element of an assembly of interchangeable mixing cold hearths, with each mixing cold hearth of the assembly configured for melting a specific category of raw material to produce a specific product.

In the mixing cold hearth 30 composition correction can optionally be performed by adding additives 46 of a known material of undesirable composition to create a new material of a desired composition.

Following processing in the mixing cold hearth 30 the atomization process can be performed using the gas atomization system 32 to form the alloy powder 48. Previously cited U.S. Pat. No. 9,925,591 B2 discloses exemplary metallurgical systems that include gas atomization systems that can be used to construct the gas atomization system 32. For example, atomization can be performed by pouring the molten metal 44 across a die that produces turbulent high-velocity gas in a sharp stream. The stream of turbulent high-velocity gas disintegrates the molten stream and produces spherical metal particles that are cooled rapidly in flight as they travel through an atomization chamber. As it is cooling in flight, the metal powder solidifies and is transferred into the cyclone 34 where it is collected as the alloy powder 48. As other examples, atomization can be performed with plasma gas, a spinning disk, a vibratory plate, or another method that disintegrates the molten metal into fine particles. Preferably, the resulting particle size of the alloy powder 48 can be between 0-350 um. In one embodiment, the alloy powder 48 has a particle size of 10-160 um. In another embodiment, a particle size of 25-50 um is produced.

Following the atomization process, the alloy powder 48 can be analyzed by the SEM analysis apparatus 36 to confirm particle size, microstructure, and elemental composition. Characterization of the alloy powder can include analysis of particle size, size distribution, morphology, density, phase behavior, elemental composition and surface characteristics. Purity, morphology, and defect-free microstructure can also be confirmed upon characterization, as well as avalanche angle and surface fractal.

Additive Manufacturing Module 14. Referring again to FIG. 1, the additive manufacturing module 14 includes a 3D printer 50 configured to perform the additive manufacturing process using the alloy powder 48 and either laser or electromagnetic energy. In the 3D printer 50, the alloy powder 48 is melted and deposited onto a build substrate, layer by layer, consolidating the particles and forming the part. Once the part is formed, it is removed from the build plate by cutting with a band-saw or EDM (Electro Discharge Machining). One suitable 3D printer 50 is an EOS M100 3D-Printer manufactured by EOS GmbH Electro Optical Systems.

Alternately additive manufacturing can be performed by direct energy deposition, powder bed fusion, cold spray, or another method where powder is consolidated into parts or near-net-shapes. Techniques are specific to each part produced, but once development of printing parameters have been completed, a production system producing one part can be rapidly reconfigured to produce another part. Also, rather than constructing whole parts in the 3D printer 50, the alloy powder 48 can be used in a cold-spray machine to repair damaged parts.

The additive manufacturing module 14 can also include a heat treatment system 52 (FIG. 1) for heat treating the as-printed parts to relieve residual internal stresses. An anneal can be performed to provide a uniform microstructure free of residual stress. Additional heat treatments such as hardening and tempering may be required, depending on the part. In general, heat treatments such as annealing, case hardening, precipitation strengthening, tempering, normalizing, or quenching can be performed to modify the properties of the part as desired.

Machining Module 16. Referring again to FIG. 1, the machining module 16 includes a machining system 54 configured to remove excess material and modify surface roughness. After 3D printing, the as-printed part surfaces are rough, and there are slight dimensional inaccuracies. To resolve these issues, the part is printed slightly too thick. The extra material is removed later during machining, and the part will then have the specified dimensions. Also, during heat treatment a scale can form on the surface of the part. This scale can be removed by shot blasting to prevent post-process difficulties in machining. After shot-blasting, the printed part can be machined to dimensional specifications. A turning center can be used to remove any excess material. Polishing may also required depending on surface finish requirements. For some parts, forming techniques can be performed to change the dimensions of the part. In addition, one or more protective coatings can be applied to each part to provide corrosion resistance.

Quality Conformance (QC) Module 18. Referring again to FIG. 1, the quality conformance (QC) module includes am inspection and evaluation system 56 configured to inspect and evaluate the metal parts. By verifying that the part measurements fall within acceptable tolerances, it is confirmed that the part meets the specifications of its design. For example, a workmanship inspection can be performed on all parts produced. X-ray CT or another method can also be used to visually inspect the internal structure of critical materials for defects and cracks. The workmanship inspection includes a visual examination of each part to ensure that there are no imperfections. Any parts that have defects will be removed from the lot for failure analysis. A coordinated measuring machine (CMM) or another method can also be used to verify part dimensions. In addition, material hardness can be determined, and tensile testing can be performed. If a protective coating is applied to the part, the coating thickness is measured, and corrosion resistance can be tested with a salt spray or another method.

Figure 3:
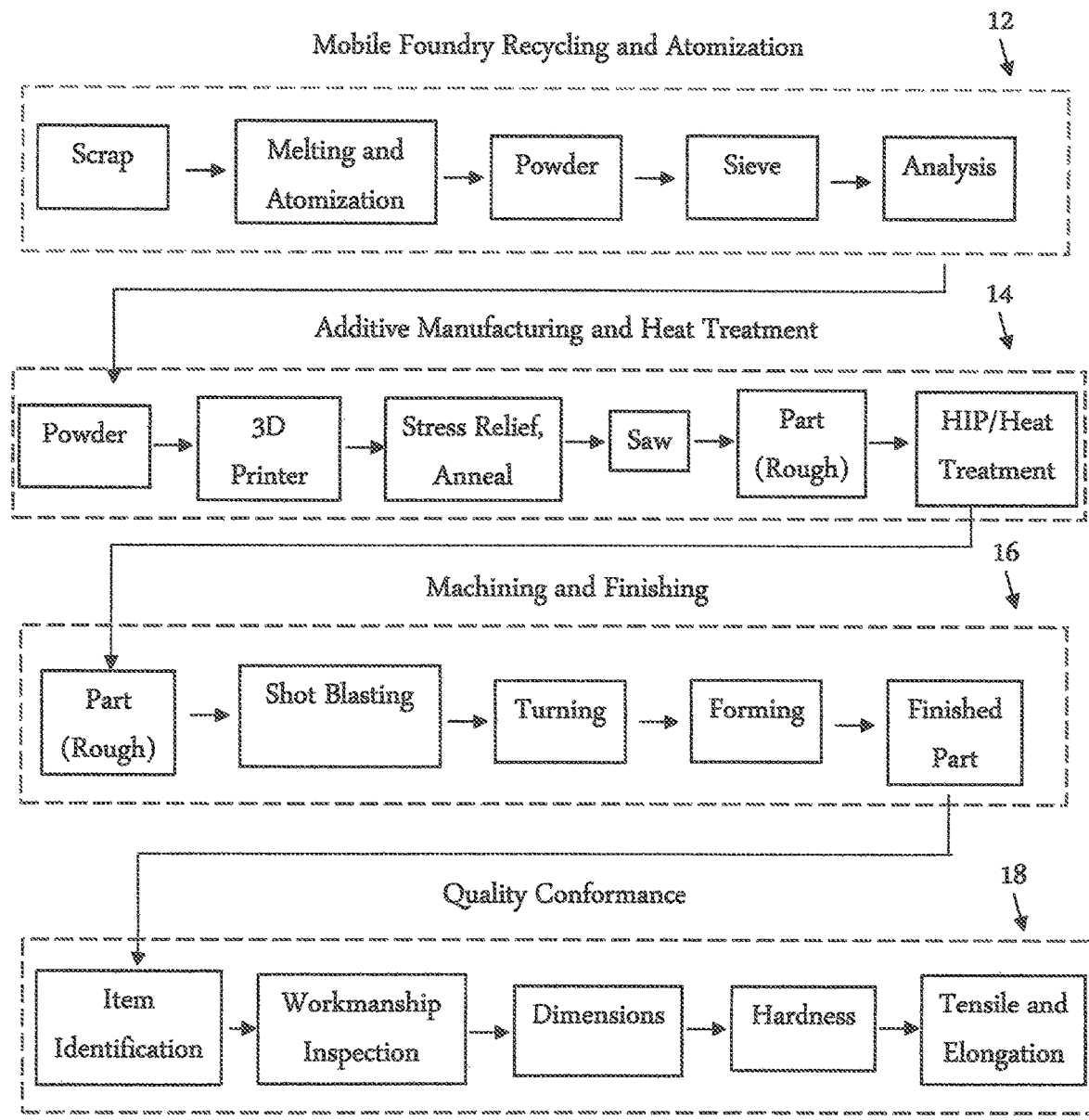
FIG. 3 is a flow diagram illustrating steps in a process for manufacturing metal parts using the deployable manufacturing center (DMC) system.

Process Flow. Referring to FIG. 3, an illustrative process for manufacturing metal parts is illustrated. In FIG. 3, oval shapes designate materials and parts and rectangles represent processes and equipment. The arrows indicate that materials or parts are being taken from one module into another for further processing. Initially, the deployable manufacturing center (DMC) system 10 is transported to a desired location, such as a remote location or a battlefield.

As shown in FIG. 3, the foundry module 12 performs the steps of melting and atomization of scrap into alloy powder, which can be sieved and analyzed. The additive manufacturing module 14 performs the steps of 3-D printing the alloy powder into rough parts, which are then sawn and heat treated using a suitable HID/heat treatment. The machining module 16 performs machining operations on the rough parts, such as shot blasting, turning and forming into finished parts. The quality conformance (QC) module 18 performs inspection and evaluation steps including item identification, workmanship inspection, measuring dimensions, evaluating hardness and testing tensile and elongation.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A process for manufacturing metal parts comprising:
providing a deployable manufacturing center (DMC) system comprising a foundry module comprising a first container containing a metallurgical system configured to convert a feedstock into an alloy powder, and an additive manufacturing (AM) module comprising a second container containing an additive manufacturing system configured to build rough metal parts from the alloy powder,
the foundry module configured to analyze a chemical composition of the feedstock, and to remove contaminants from the feedstock,
the metallurgical system comprising a mixing cold hearth configured to melt the feedstock into a molten metal having a uniform composition and an atomization system configured to atomize the molten metal into the alloy powder;
deploying the deployable manufacturing center (DMC) system to a desired location;
analyzing the chemical composition of the feedstock and removing the contaminants from the feedstock using the foundry module;
forming the alloy powder from the feedstock using the mixing cold hearth to melt the feedstock into the molten metal and the atomization system to atomize the molten metal into the alloy powder; and
forming the rough metal parts from the alloy powder using the additive manufacturing (AM) module.

2. The process of claim 1 further comprising providing a machining module comprising a third container containing machinery configured to machine the rough metal parts, and then machining the rough metal parts into machined metal parts using the machining module.

3. The process of claim 1 further comprising providing a quality conformance (QC) module comprising a fourth container containing equipment configured to inspect and evaluate the metal parts; and then inspecting and evaluating the metal parts using the quality conformance (QC) module.

4. The process of claim 1 wherein the metallurgical system further comprises a plasma torch configured to heat the feedstock into the molten metal.

5. The process of claim 1 wherein the mixing cold hearth further comprises a composition correction system for adding additives to the molten metal.

6. The process of claim 1 wherein the additive manufacturing (AM) module comprises a 3-D printer.

7. The process of claim 1 wherein the additive manufacturing module further comprises a heat treating system and further comprising heat treating the rough metal parts using the heat treating system.

8. The process of claim 1 wherein the feedstock comprises scrap metal.

9. The process of claim 1 wherein the feedstock comprises a metal selected from the group consisting of steel, stainless steel, aluminum and copper.

10. A process for manufacturing metal parts comprising:
providing a deployable manufacturing center (DMC) system comprising:
a foundry module configured to store a feedstock, to remove contaminants from the feedstock, to melt the feedstock to form a molten metal, and to atomize the molten metal into an alloy powder, the foundry module comprising a metallurgical system and a first container configured to contain the metallurgical system, the metallurgical system comprising a plasma torch configured to heat the feedstock into the molten metal, a mixing cold hearth configured to mix the molten metal into a uniform composition and an atomization system configured to atomize the molten metal into the alloy powder; and
an additive manufacturing (AM) module configured to form the alloy powder from the foundry module into rough metal parts, the additive manufacturing (AM) module comprising an additive manufacturing system and a second container configured to contain the additive manufacturing system, the additive manufacturing (AM) system comprising a system selected from the group consisting of 3-D printer systems, direct energy deposition systems, powder bed fusion systems and cold spray systems, the first container and the second container configured for deployment to a desired location for manufacturing the metal parts at the desired location;
deploying the deployable manufacturing center (DMC) system to the desired location;
storing the feedstock, analyzing the chemical composition of the feedstock and removing the contaminants from the feedstock using the foundry module;
forming the alloy powder from the feedstock using the mixing cold hearth to melt the feedstock into the molten metal and the atomization system to atomize the molten metal into the alloy powder; and
forming the rough metal parts from the alloy powder using the additive manufacturing (AM) module.

11. The process of claim 10 further comprising providing a machining module configured to machine the rough metal parts formed by the additive manufacturing (AM) module, the machining module comprising a machining system and a third container configured to contain the machining system, and then machining the rough metal parts into the metal parts using the machining module.

12. The process of claim 11 further comprising providing a quality conformance (QC) module comprising a fourth container containing equipment configured to inspect and evaluate the metal parts; and then inspecting and evaluating the metal parts using the quality conformance (QC) module.

13. The process of claim 12 wherein the first container, the second container, the third container and the fourth container comprise metal shipping containers.

14. The process of claim 10 wherein the feedstock comprises scrap metal.

15. A process for manufacturing metal parts comprising:
providing a deployable manufacturing center (DMC) system comprising:
an array of transportable modules containing equipment configured to convert a feedstock into an alloy powder, and then to build the metal parts from the alloy powder using an additive manufacturing (AM) process,
the modules including a foundry module configured to store a feedstock, to remove contaminants from the feedstock, to melt the feedstock to form a molten metal, and to atomize the molten metal into an alloy powder, the foundry module comprising a metallurgical system and a first container configured to contain the metallurgical system, the metallurgical system comprising a plasma torch configured to heat the feedstock into the molten metal, a mixing cold hearth configured to mix the molten metal into a uniform composition and an atomization system configured to atomize the molten metal into the alloy powder, the mixing cold hearth including a composition correction system for adding additives to the molten metal;

an additive manufacturing (AM) module configured to form the alloy powder from the foundry module into rough metal parts, the additive manufacturing (AM) module comprising a 3-D printer and a second container configured to contain the 3-D printer, the 3-D printer configured to form the alloy powder into the rough metal parts; and a machining module configured to machine the rough metal parts formed by the additive manufacturing (AM) module into the metal parts, the machining module comprising a machining system and a third container configured to contain the machining system;

the first container, the second container, and the third container configured for deployment to a desired location for manufacturing the metal parts at the desired location;

deploying the deployable manufacturing center (DMC) system to the desired location;

storing the feedstock, and removing the contaminants from the feedstock using the foundry module;

forming the alloy powder from the feedstock using the mixing cold hearth to melt the feedstock into the molten metal and the atomization system to atomize the molten metal into the alloy powder;

forming the rough metal parts from the alloy powder using the additive manufacturing (AM) module; and machining the rough metal parts into the metal parts using the machining module.

16. The process of claim 15 wherein the additive manufacturing (AD) module further comprises a heat treatment system for heat treating the rough metal parts, and further comprising heat treating the rough metal parts using the heat treatment system.

17. The process of claim 15 wherein the first container, the second container and the third container comprise metal shipping containers.

18. The process of claim 15 wherein the foundry module further comprises a SEM apparatus configured to confirm particle size, microstructure, and elemental composition of the alloy powder, and further comprising confirming the particle size, the microstructure, and the elemental composition of the alloy powder using the SEM apparatus.

19. The process of claim 15 further comprising providing a quality conformance (QC) module comprising a fourth container containing equipment configured to inspect and evaluate the metal parts; and then inspecting and evaluating the metal parts using the quality conformance (QC) module.

20. The process of claim 15 wherein the feedstock comprises a metal selected from the group consisting of steel, stainless steel, aluminum and copper.

* * * * *